(12) United States Patent
Wong et al.

(10) Patent No.: US 7,046,634 B2
(45) Date of Patent: May 16, 2006

(54) METHOD AND APPARATUS FOR SELECTING MAXIMALLY DISJOINT SHORTEST PATHS IN A NETWORK

(75) Inventors: Vincent Chi Chiu Wong, Ottawa (CA); Peter Steven Pieda, Ottawa (CA); Udo Mircea Neustadter, Ottawa (CA)

(73) Assignee: Tropic Networks Inc., Kanata (CA)

( * ) Notice: Subject to any disclaimer, the term of this patent is extended or adjusted under 35 U.S.C. 154(b) by 997 days.

(21) Appl. No.: 10/121,654

(22) Filed: Apr. 15, 2002

(65) Prior Publication Data

US 2003/0193898 A1    Oct. 16, 2003

(51) Int. Cl.
*H04J 1/16* (2006.01)
(52) U.S. Cl. ........................ 370/238; 370/248
(58) Field of Classification Search .......... 370/237, 370/238, 238.1, 248, 252, 351, 400, 229, 370/235, 254, 255; 709/239, 241, 235
See application file for complete search history.

(56) References Cited

U.S. PATENT DOCUMENTS

| 5,872,773 | A  |   | 2/1999  | Katzela et al. |         |
|-----------|----|---|---------|----------------|---------|
| 6,542,469 | B1 | * | 4/2003  | Kelley et al.  | 370/238 |
| 6,804,199 | B1 | * | 10/2004 | Kelly et al.   | 370/238 |
| 6,882,627 | B1 | * | 4/2005  | Pieda et al.   | 370/248 |

OTHER PUBLICATIONS

"Dictionary of Algorithms and Data Structures", Internet website: www.nist.gov/dads/.

R.G. Ogier, B. Bellur and N. Taft-Plotkin, "An Efficient Algorithm for Computing Shortest and Widest Maximally Disjoint Paths", SRI International Technical Report ITAD-1616-TR-170, Nov. 1998.

N..Taft-Plotkin, B. Bellur and R. Ogier, "Quality-of-Service Routing Using Maximally Disjoint Paths", Proceedings of International Workshop on Quality-of-Service, Jun. 1999.

J.W. Suurballe and R.E. Tarjan, "A Quick Method for Finding Shortest Pairs of Disjoint Paths", published in *Networks*, 14, 1984.

R. Bhandari, "Survivable Networks" Algorithms for Diverse Routing, Kluwer Academic Publishers, 1999.

* cited by examiner

*Primary Examiner*—Brenda Pham
(74) *Attorney, Agent, or Firm*—Victoria Donnelly

(57) ABSTRACT

A method for selecting two maximally disjoint shortest paths between a source node and destination node in a network is provided. The method comprises determining a first explicit route between the source and destination nodes by using an original link cost for each link in the network, transforming the network by introducing conditional link costs, determining a second explicit route between the source and destination nodes in the transformed network taking into account the conditional link costs, and determining the two maximally disjoint shortest paths between the source and destination nodes by coalescing the first and second explicit routes. Beneficially, the step of introducing conditional link costs comprises adding additional parameters to links in the network and determining the conditional link costs depending on the position of each link relative to the first explicit route. Corresponding method for determining "N" maximally disjoint paths in a network, wherein "N" is equal or greater than two, is also provided.

24 Claims, 13 Drawing Sheets

METHOD AND APPARATUS FOR SELECTING MAXIMALLY DISJOINT SHORTEST PATHS IN A NETWORK

FIELD OF THE INVENTION

The invention relates generally to methods for performing path searches in communications networks, and in particular, to a method and apparatus for selecting maximally disjoint shortest paths in a network.

BACKGROUND OF THE INVENTION

Methods for searching suitable paths in a network is a well established discipline with many solved and unsolved problems.

A Shortest Path First (SPF) algorithm, often referred to as the Dijkstra algorithm, is a method commonly used to find the shortest path between nodes in a network. A brief description of this classical problem and of some algorithms which solve it, can be found at the Internet website http://hissa.nist.gov/dads/HTML/shortestpath.html.

Often, it is necessary to find more than one path between a source and a destination. For example, a second path must be found after a failure disrupts a first path. A new path may be computed after a failure has occurred, but in many networks it is desirable to pre-calculate alternate paths before any failure occurs, so that a new path is immediately available in the event of a failure. Furthermore, it is desirable that the alternate path use, as much as possible, different network resources such as nodes and links, than the first path.

Fully disjoint shortest paths between the same source-destination pair are the shortest paths that do not share nodes or links. In real networks, fully disjoint paths may not be possible, and it is desired to find maximally disjoint shortest paths.

The problem of finding multiple disjoint paths is also a classical problem, but unlike the simple path search, does not have a known efficient (scaleable to large networks) perfect solution.

In U.S. Pat. No. 5,872,773 to Katzela et al. is disclosed a heuristic method for determining disjoint routing trees providing maximally disjoint paths in a cellular network. This method is based on destination rooted trees, suitable for cellular networks.

An algorithm for computing shortest and widest maximally disjoint paths is reported in a conference paper by R. Ogier, B. Bellur, and N. Taft-Plotkin entitled "An Efficient Algorithm for Computing Shortest and Widest Maximally Disjoint Paths", SRI International Technical Report ITAD-1616-TR-170, November 1998. This method in turn is based upon an algorithm by J. W. Suurballe and R. E. Tarjan "A Quick Method for Finding Shortest Pairs of Disjoint Paths", published in *Networks,* 14, 1984. The disadvantages of this method are found to be the following:

All paths are pre-computed in advance of setup requests;

The algorithm only finds 2 disjoint path pairs;

The algorithm determines all disjoint path pairs from a source to all destinations (in tree format);

All paths are computed upon every receipt of a QoS (Quality of Service) message update.

The algorithm is based on a modified Suurballe/Tarjan algorithm for disjoint paths, and, overall, is complex, memory and computationally expensive.

Below is provided a brief description of this algorithm.

Phase 1: Compute all Max Bandwidth disjoint path pairs from source to all destinations;

Phase 2: Transform Bandwidth/Cost of each link not used in the original tree;

Phase 3: Each node has five variables used in complex calculations;

Phase 4: Get the two paths from the resulting network, mark all links as unmarked, and then traverse the network topology (or graph).

With four complex phases, this algorithm is difficult to implement in software and to maintain in operation.

An extensive discussion of the general problem of finding multiple disjoint paths, and a proposed "split-node" solution to it, can be found in the text book "Survivable Networks: Algorithms for Diverse Routing" by Dr. Ramesh Bhandari, Kluwer Academic Publishers, 1999. This book contains detailed algorithms for calculating disjoint pairs of paths, maximally disjoint paths if full diversity does not exist, and K (K greater than 2) disjoint paths.

While the "split-node" method generates a solution to the problem, it requires a network transformation, in which many nodes are split (i.e. a single node is represented by two nodes), resulting in inefficiency in path computation for a large network.

Accordingly, there is a need in industry for the development of an alternative method, which would provide efficient and reliable generation of multiple maximally disjoint shortest paths in a network and would avoid the above mentioned drawbacks.

SUMMARY OF THE INVENTION

It is therefore an object of the invention to provide a method and apparatus for efficient and reliable generation of maximally disjoint shortest paths in a network.

According to one aspect of the invention there is provided a method for selecting two maximally disjoint shortest paths between a source node and destination node in a network, comprising the steps of:

determining a first explicit route between the source and destination nodes by using an original link cost for each link in the network;

transforming the network by introducing conditional link costs;

determining a second explicit route between the source and destination nodes in the transformed network taking into account the conditional link costs; and determining the two maximally disjoint shortest paths between the source and destination nodes by coalescing the first and second explicit routes.

Beneficially, the step of introducing conditional link costs comprises the step of adding additional parameters to links in the network and determining the conditional link costs depending on the position of each link relative to the first explicit route.

Conveniently, the step of adding the additional parameters comprises adding a first conditional link cost (LC1), a second conditional link cost (LC2), and a router list parameter. The step of adding the first conditional link cost comprises adding the first conditional link cost, which is equal to one of the following:

original link cost;

original link cost plus a large cost, the large cost being of the order of several times the sum of the original link costs of all links in the network; and zero.

The step of adding the second conditional link cost comprises adding the second conditional link cost, which is equal to one of the following:

original link cost plus a large cost, the large cost being of the order of several times the sum of the original link costs of all links in the network; and zero.

The step of determining the conditional link costs depending on the position of each link relative to the first explicit route, comprises the step of assigning LC1 equal to one of the following:

the original link cost plus the large cost, if the link is a link belonging to the first explicit route; and the original link cost otherwise.

Advantageously, the step of determining the conditional link costs, depending on the position of each link relative to the first explicit route, comprises the step of assigning LC1 equal to the original link cost plus the large cost, if the link is a link belonging to the first explicit route and not the first link of the first explicit route.

Beneficially, the step of determining the conditional link costs, depending on the position of each link relative to the first explicit route, comprises the step of assigning LC2 equal to:

the original link cost plus the large cost, if the link does not belong to the first explicit route, but originates from a node on the first explicit route except the source and destination nodes; and zero otherwise.

Conveniently, the step of adding the router list parameter comprises adding the router list parameter to a link, which originates from a node on the first explicit route and terminates on a node that is not the next node on the first explicit route, the router list parameter indicating the next node on the first explicit route.

In the method described above, the step of determining the second explicit route between the source and destination nodes in the transformed network comprises the step of determining a path from the source node to the destination node by using a conditional link cost LC, which is set equal to one of following:

LC1;

LC2; and the original link cost.

The step of determining the path from the source node to the destination node by using the conditional link cost comprises setting LC equal to one of the following:

LC is equal to the original link cost if both LC1 and LC2 equal to zero;

LC=LC2 if LC2 is not zero, and if the router list parameter of the link is not indicating the previous node of the second explicit route; and LC=LC1 otherwise.

According to another aspect of the invention there is provided a method for selecting "N" maximally disjoint shortest paths between a source node and destination node in a network, "N" being equal or greater than two, the method comprising the steps of:

(a) determining a first explicit route between the source and destination nodes by using an original link cost for each link in the network;

(b) for each explicit route found so far, transforming the network by introducing conditional link costs;

(c) determining the next explicit route between the source and destination nodes in the transformed network taking into account the conditional link costs;

(d) removing conditional link costs;

(e) determining maximally disjoint shortest paths represented by the explicit routes found so far between the source and destination nodes by coalescing the explicit routes found so far; and (f) repeating the steps (b) to (e) "i" number of times, wherein "i"=N−1.

Advantageously, the step of introducing conditional link costs comprises the step of adding additional parameters to links in the network and determining the conditional link costs depending on the position of each link relative to each explicit route found so far, e.g. adding a first conditional link cost (LC1), a second conditional link cost (LC2), and a router list parameter.

Beneficially, the step of adding the first conditional link cost comprises adding the first conditional link cost, which is equal to one of the following:

the original link cost;

the link cost assigned so far;

original link cost plus a large cost, the large cost being of the order of several times the sum of the original link costs of all links in the network;

the link cost assigned so far plus the large cost; and zero.

The step of adding the second conditional link cost comprises adding the second conditional link cost, which is equal to one of the following:

original link cost plus a large cost, the large cost being of the order of several times the sum of the original link costs of all links in the network;

the link cost assigned so far plus the large cost; and zero.

Conveniently, the step of determining the conditional link costs depending on the position of each link relative to each of the explicit routes found so far comprises the step of assigning LC1 equal to one of the following, the step being performed for each of the explicit routes found so far:

the original link cost plus the large cost, if the link is a link belonging to the explicit route and LC1=0 before the step of assigning LC1 is performed;

the link cost assigned so far plus the large cost, if the link is a link belonging to the explicit route and LC1 is not zero before the step of assigning LC1 is performed; and the original link cost otherwise.

The step of assigning LC1 comprises the step of assigning LC1 equal to the original link cost plus the large cost, if the link is a link belonging to the explicit route and not the first link of the explicit route.

Conveniently, the step of determining the conditional link costs depending on the position of each link relative to the explicit routes found so far comprises the step of assigning LC2 equal to one of the following, the step being performed for each of the explicit routes found so far:

the original link cost plus the large cost, if the link does not belong to the explicit route, but originates from a node on the explicit route except the source and destination nodes and LC2=0 before performing the step of assigning LC2;

the link cost assigned so far plus the large cost, if the link does not belong to the explicit route, but originates from a node on the explicit route except the source and destination nodes and LC2 is not zero before performing the step of assigning LC2; and zero otherwise.

In the method described above, the step of adding the router list parameter comprises adding the router list parameter to a link, which originates from a node on the explicit route and terminates on a node that is not the next node on the explicit route, the router list parameter indicating the next node on the explicit route, the step being performed for each of the explicit routes found so far.

The step of determining the next explicit route between the source and destination nodes in the transformed network comprises the step of determining a path from the source node to the destination node by using a conditional link cost LC, which is set equal to one of following:

LC1;
LC2; and
the original link cost.

The step of determining the path from the source node to the destination node comprises setting the conditional link cost equal to one of the following:

LC is equal to the original link cost if both LC1 and LC2 are equal to zero;
LC=LC2 if LC2 is not zero, and if the router list parameter of the link is not indicating the previous node of the second explicit route; and
LC=LC1 otherwise.

According to another aspect of the invention there is provided a communications network having a plurality of nodes connected with links, the network comprising means for selecting two maximally disjoint shortest paths between source and destination nodes in the network, the means being capable of performing the steps of the method for selecting two maximally disjoint shortest paths in the network as described above.

According to yet another aspect of the invention there is provided a communications network having a plurality of nodes connected with links, the network comprising means for selecting "N" maximally disjoint shortest paths between source and destination nodes in the network, the means being capable of performing the steps of the method for selecting "N" maximally disjoint shortest paths in the network described above.

According to one more aspect of the invention there is provided an apparatus for selecting two maximally disjoint shortest paths between source and destination nodes in the network, the apparatus comprising a path computation processor capable of performing the steps of the method for selecting two maximally disjoint shortest paths in the network as described above.

According to one more aspect of the invention there is provided an apparatus for selecting "N" maximally disjoint shortest paths between source and destination nodes in the network, the apparatus comprising a path computation processor capable of performing the steps of the method for selecting "N" maximally disjoint shortest paths in the network described above.

Advantages of the embodiments of the invention lie in significant simplifications of finding maximally disjoint shortest paths in a network compared to the currently known methods. It results in a more efficient implementation of the method, which, in turn, permits maximally disjoint paths to be determined more quickly and for larger or more complex networks, for which existing methods would have been too slow or cumbersome.

BRIEF DESCRIPTION OF THE DRAWINGS

The invention will now be described in greater detail with reference to the attached drawings, in which.

DETAILED DESCRIPTION OF THE PREFERRED EMBODIMENTS

Figure 1:
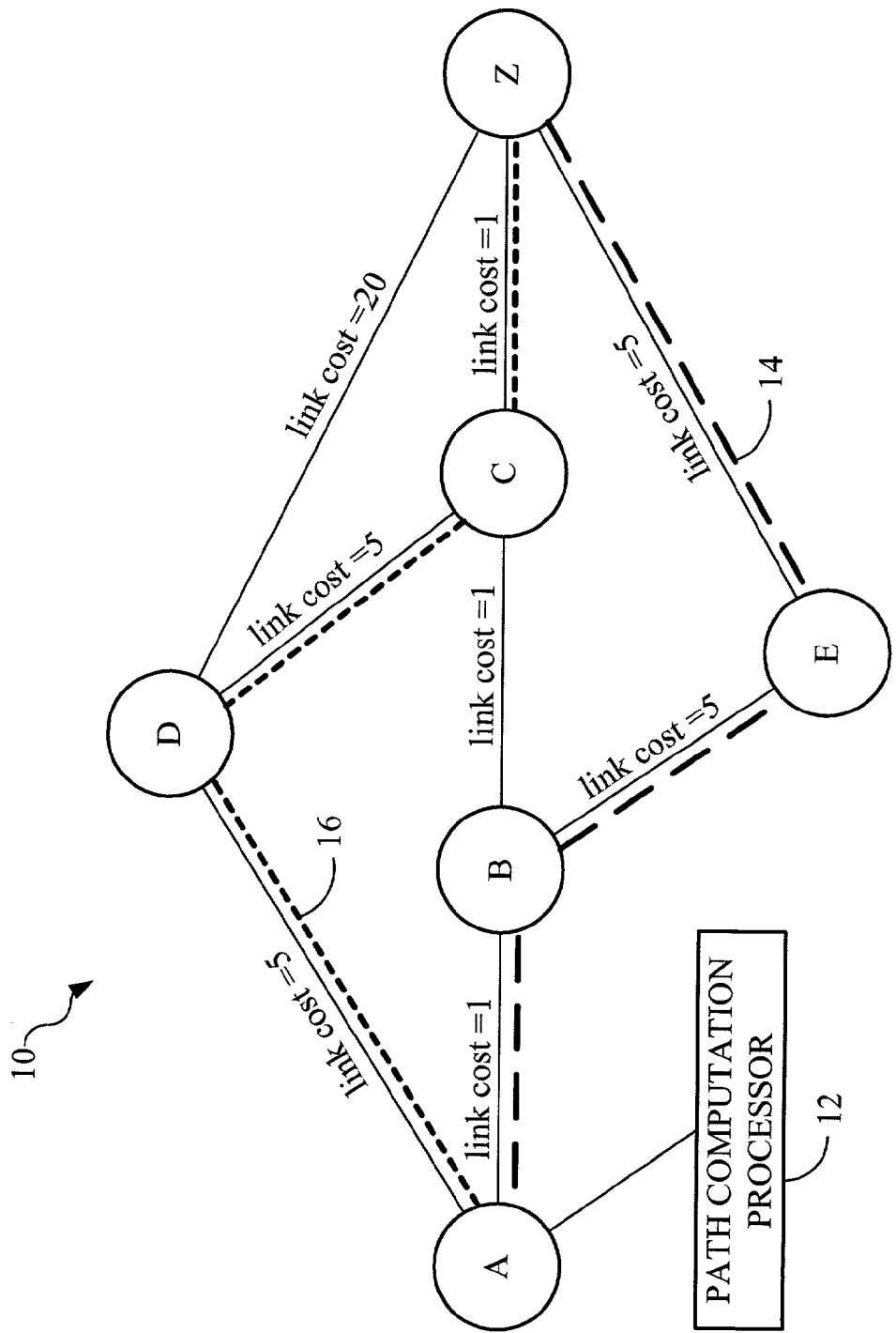
FIG. 1 is an exemplary diagram of a network for illustrating a method of selecting maximally disjoint shortest paths of the embodiments of the invention.

An example of a network 10 to be used for illustrating a method for selecting maximally disjoint paths according to the embodiments of the invention is shown in FIG. 1. The network 10 has six nodes (A, B, C, D, E, Z) and eight links, wherein each link is identified by its endpoints, for example link AD joins node A to node D. Each link is further labeled with a number indicating a link cost, for example, the link cost of link AD is 5. Link cost is a parameter commonly used in path search algorithms to reflect the length or other property of a link where a higher link cost makes a link less desirable to be used.

Also shown in FIG. 1 is a path computation processor 12, associated with node "A". There may be a path computation processor 12 associated with other nodes as well, but only the path computation processor 12 associated with node "A" is shown. The path computation processor 12 is adapted to perform the steps of the method of the embodiments of the invention described hereunder. It is understood that the path computation processor 12, in order to perform its function, has memory means, in which is stored information about the network, including the link costs. This information may be obtained with any of numerous known methods, the details of which are outside the scope of the present invention.

The method of the first embodiment of the invention provides selection of two disjoint paths between node "A" and node "Z". Additionally, the method of the first embodiment provides the two paths in the network that are as short as possible, where their length is defined as the sum of the link costs of the links forming a path. The solution found by the algorithm will be in the form of an "explicit route" for each path found. An explicit route is a list of links that form a path, for example, one path from "A" to "Z" may be expressed as the explicit route AB-BC-CZ including the three links AB, BC, CZ, in order. The explicit route AB-BC-CZ extends from node "A" through nodes "B" and "C" to node "Z". The network 10 illustrated in FIG. 1 is of great simplicity, but sufficient to illustrate the method.

Figure 2:
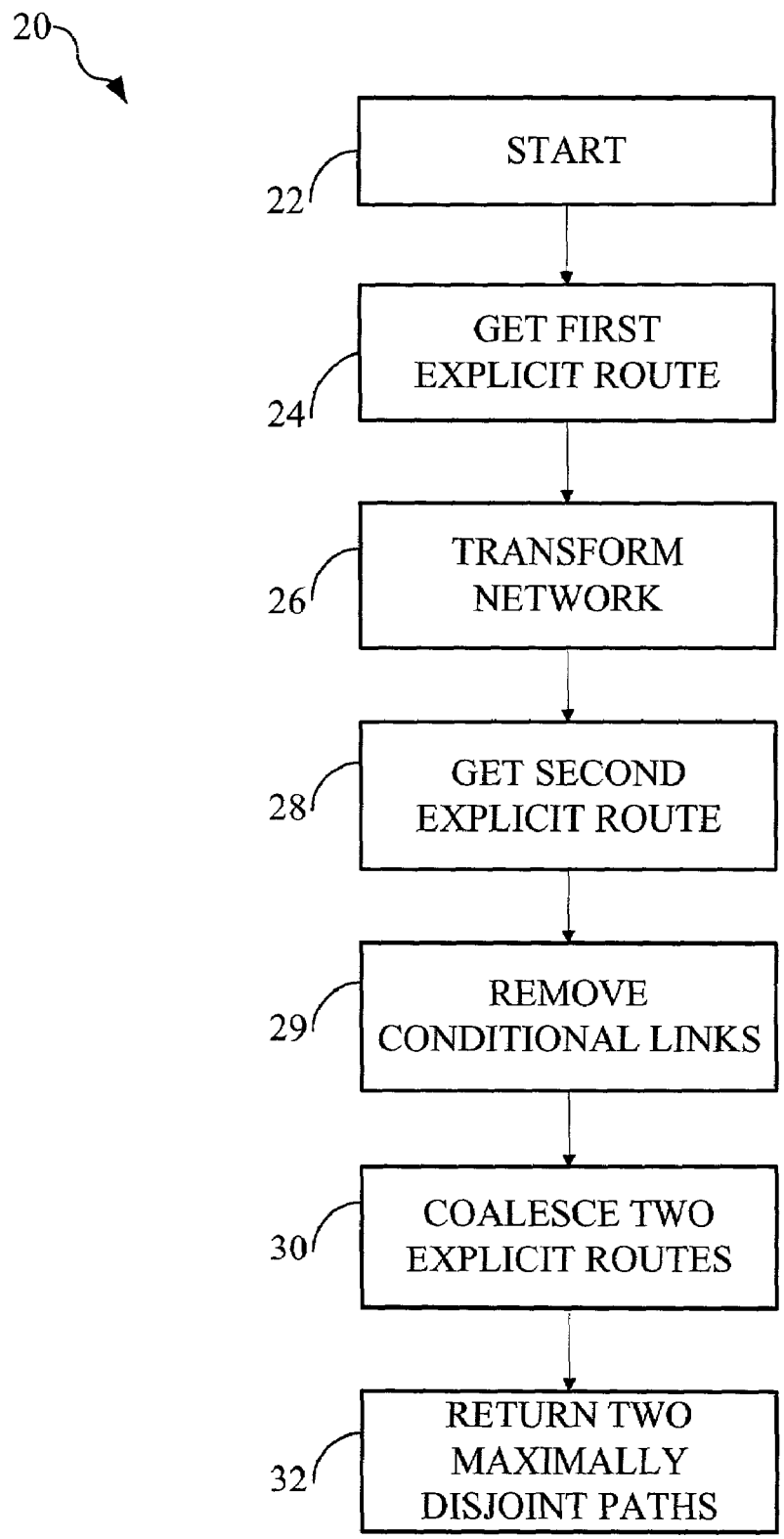
FIG. 2 is a flow chart illustrating a method for selecting two maximally disjoint shortest paths according to a first embodiment of the invention.

A high-level flow chart 20 of the method of the first embodiment is shown in FIG. 2. The flow chart includes seven steps in a simple sequence, beginning at step 22 ("Start"), continuing through step 24 ("Get First Explicit Route"), step 26 ("Transform Network"), step 28 ("Get Second Explicit Route"), step 29 ("Remove Conditional Links"), step 30 ("Coalesce two Explicit Routes"), and ending at step 32 ("Return two Maximally Disjoint Paths").

At the step 22 ("Start"), the network topology (for example, the network 10 of FIG. 1), including link costs, and the identities of the source and destination nodes between which paths are to be found (for example nodes A and Z of FIG. 1) are known.

The step "Get First Explicit Route" 24 uses a shortest path first (SPF) algorithm of the known art, for example a Dijkstra SPF algorithm, to find a first shortest path. Using the example network 10 of FIG. 1 again, step 24 will determine the first explicit route as AB-BC-CZ.

Figure 3:
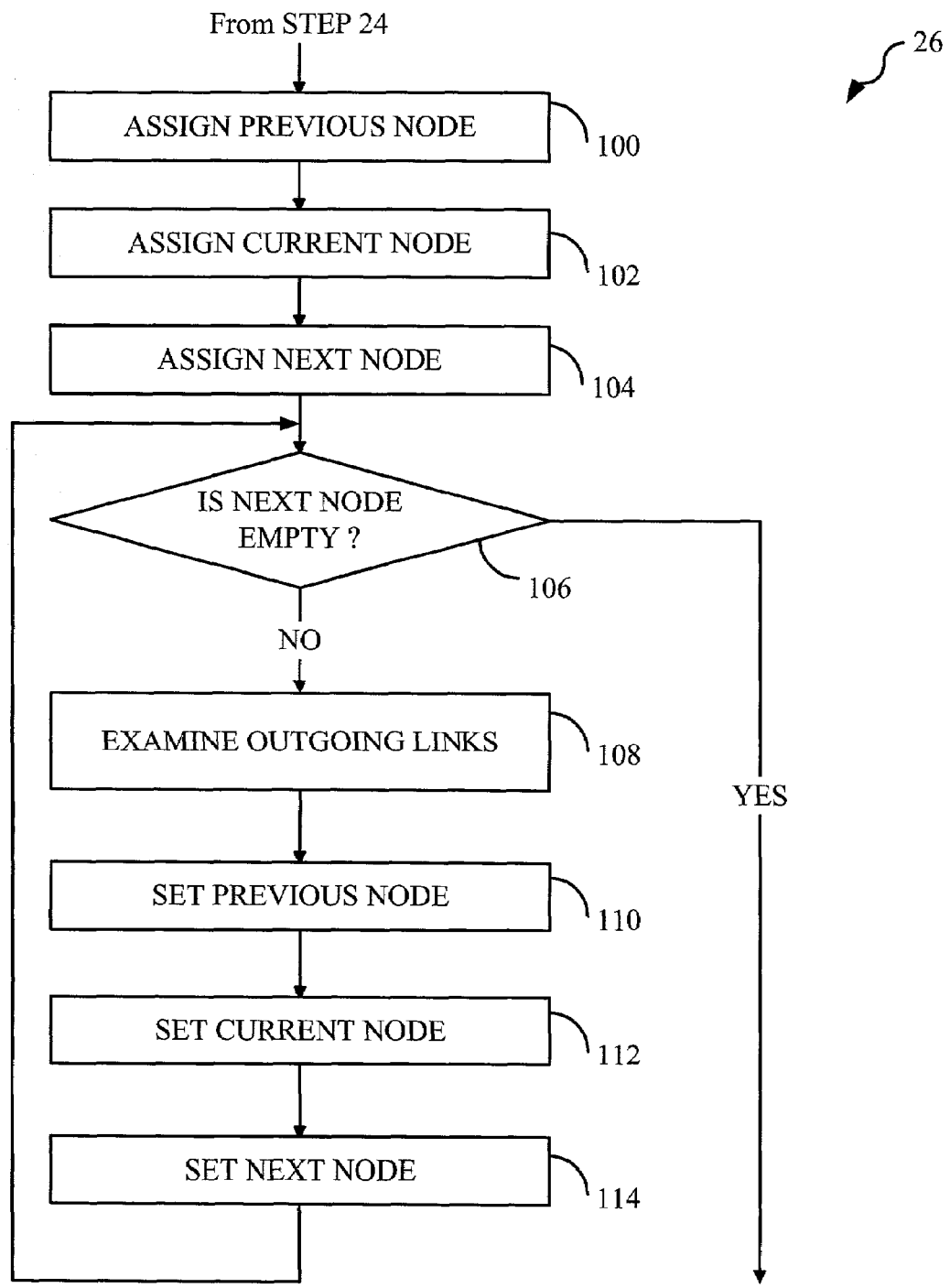
FIG. 3 is a flow chart illustrating the step 26 of network transformation of FIG. 2 in more detail.
Figure 4:
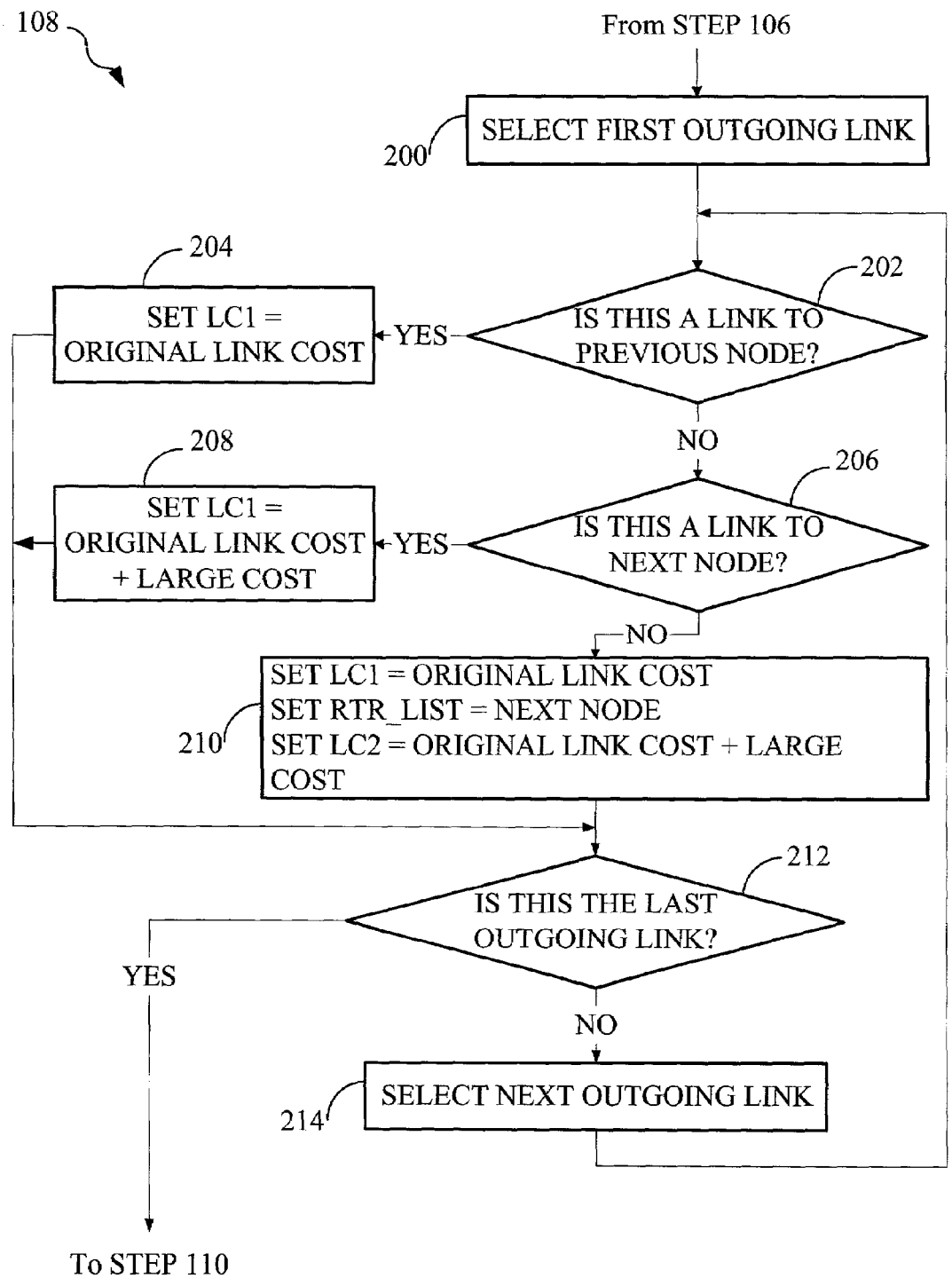
FIG. 4 is a flow chart illustrating the step 108 of examining outgoing links and assigning conditional link costs of FIG. 3 in more detail.

In the step "Transform Network" 26, a transformation of the network 10 of FIG. 1 will be generated as described in detail later (FIGS. 3 and 4). Network transformation is a step that assigns conditional links, based on the first explicit route found in step 24.

Figure 5:
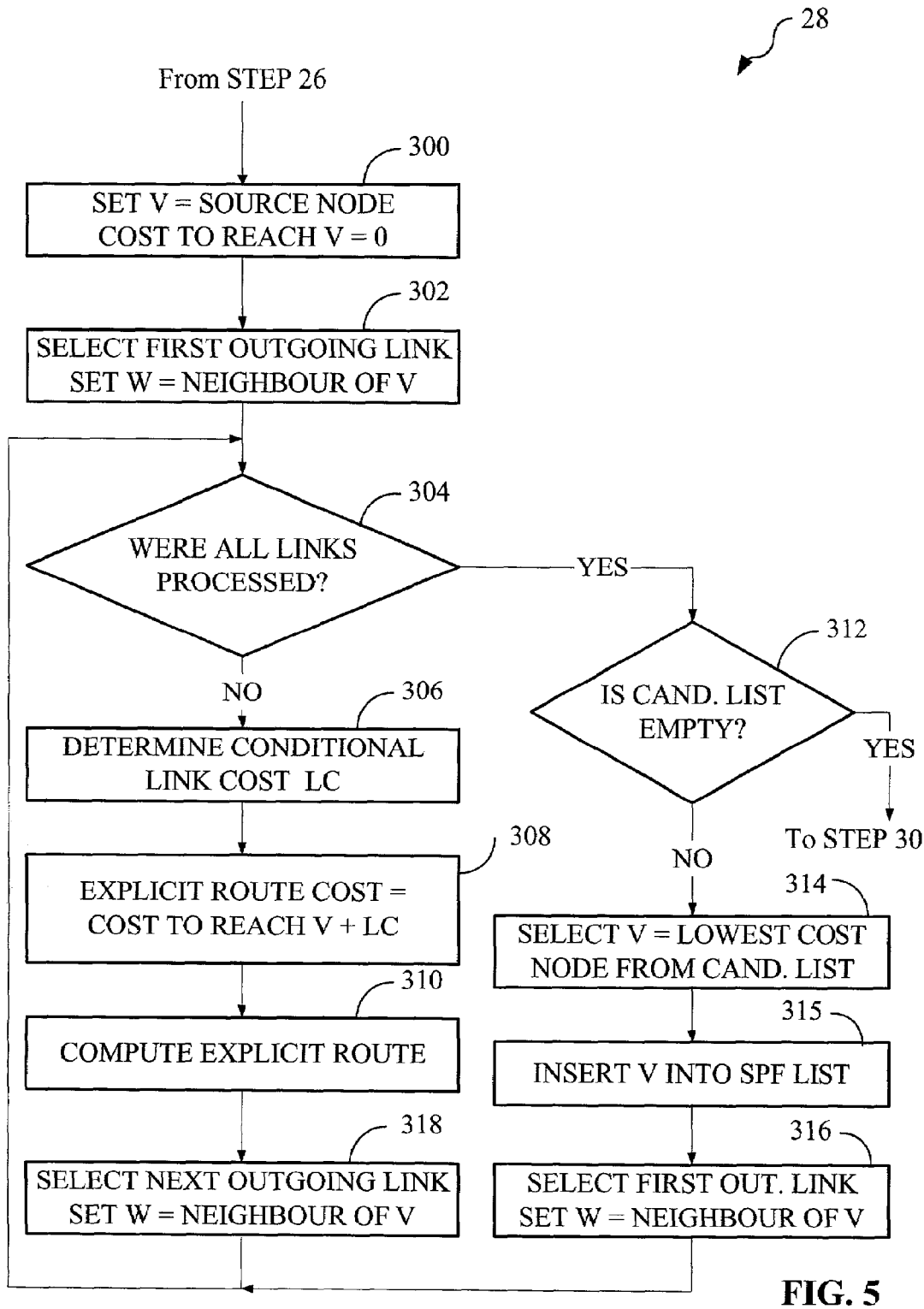
FIG. 5 is a flow chart illustrating the step 28 of obtaining a second explicit route of FIG. 2 in more detail.
Figure 6:
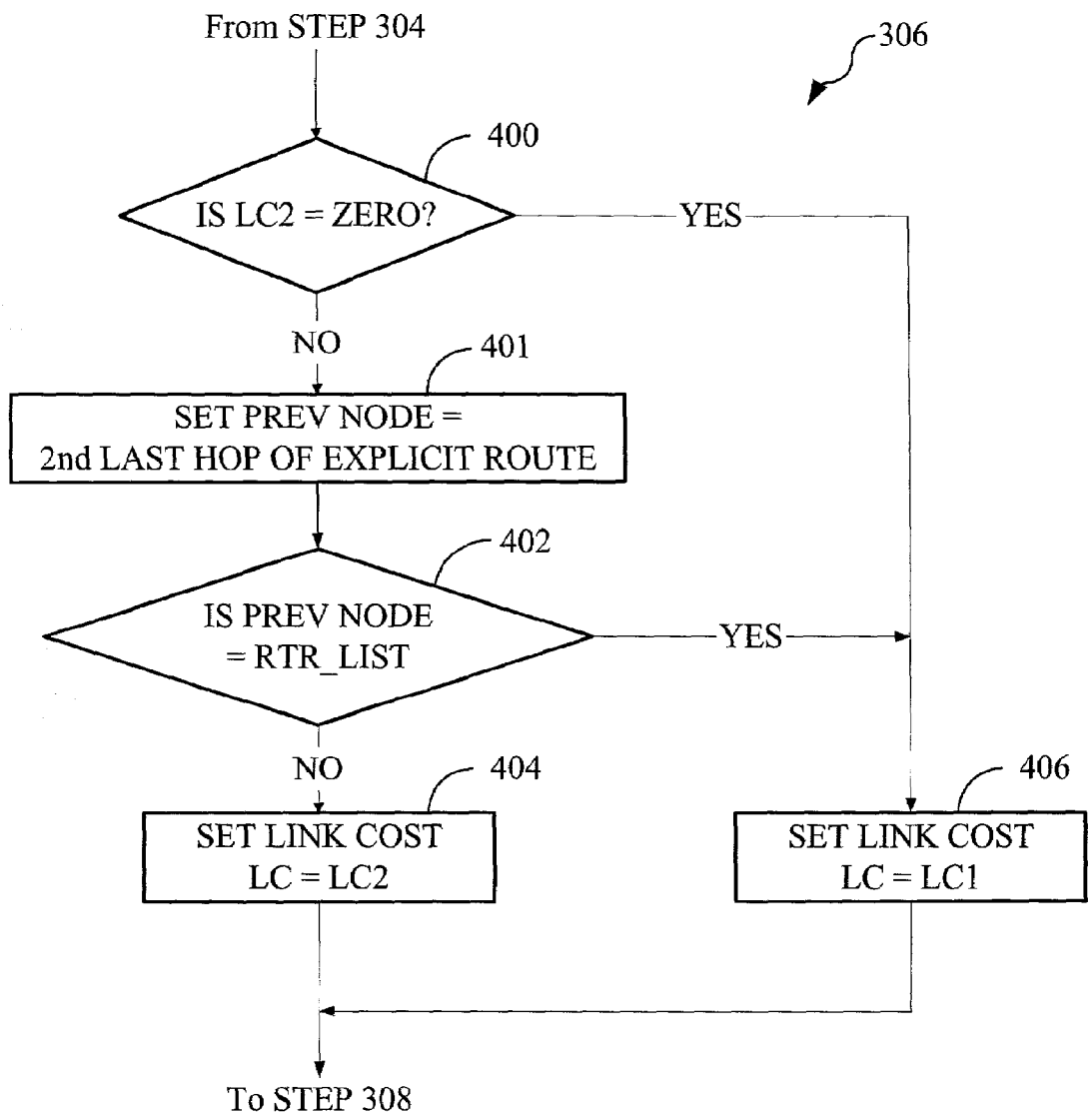
FIG. 6 is a flow chart illustrating the step 306 of determining a conditional link cost of FIG. 5 in more detail.
Figure 7:
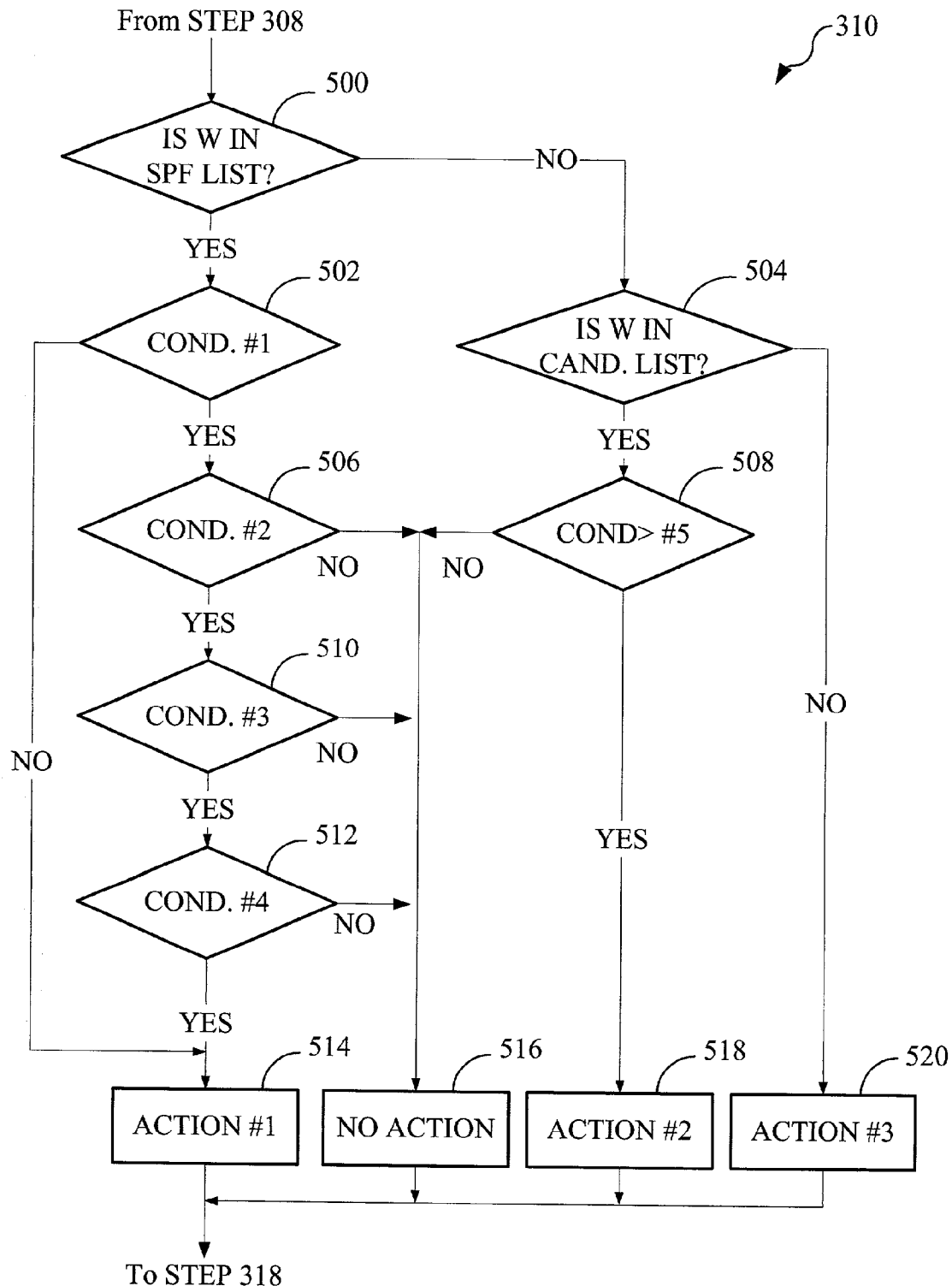
FIG. 7 is a flow chart illustrating the step 310 of assigning an explicit route of FIG. 5 in more detail.

The step "Get Second Explicit Route" 28 uses a modified SPF algorithm on the transformed network to generate the second explicit route. This step will be described in more detail later (FIGS. 5, 6, and 7). In the example network 10 of FIG. 1, the second explicit route will be determined by step 28 as AD-DC-CB-BE-EZ.

Figure 8:
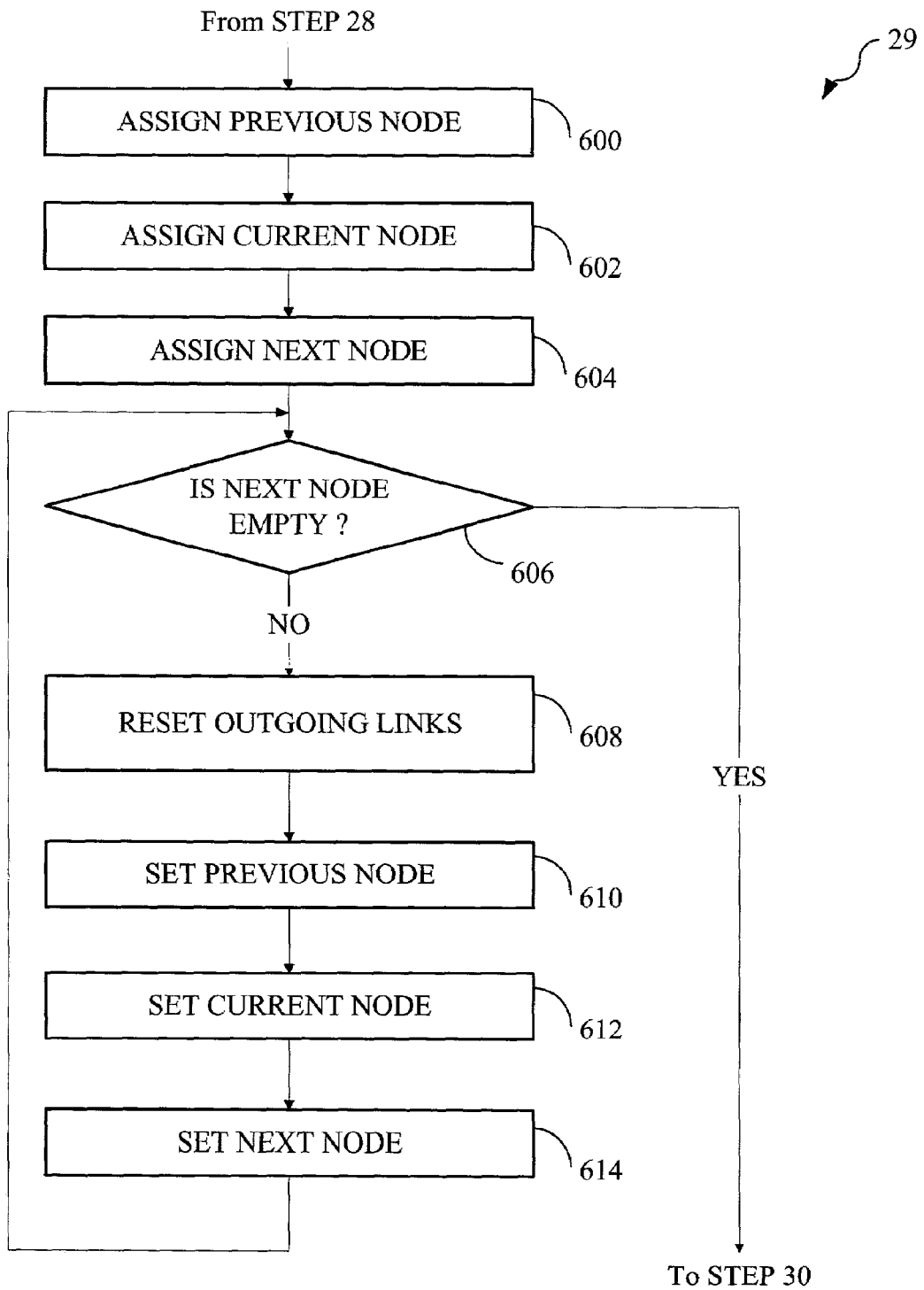
FIG. 8 is a flow chart illustrating the step 29 of removing conditional links of FIG. 2 in more detail.
Figure 9:
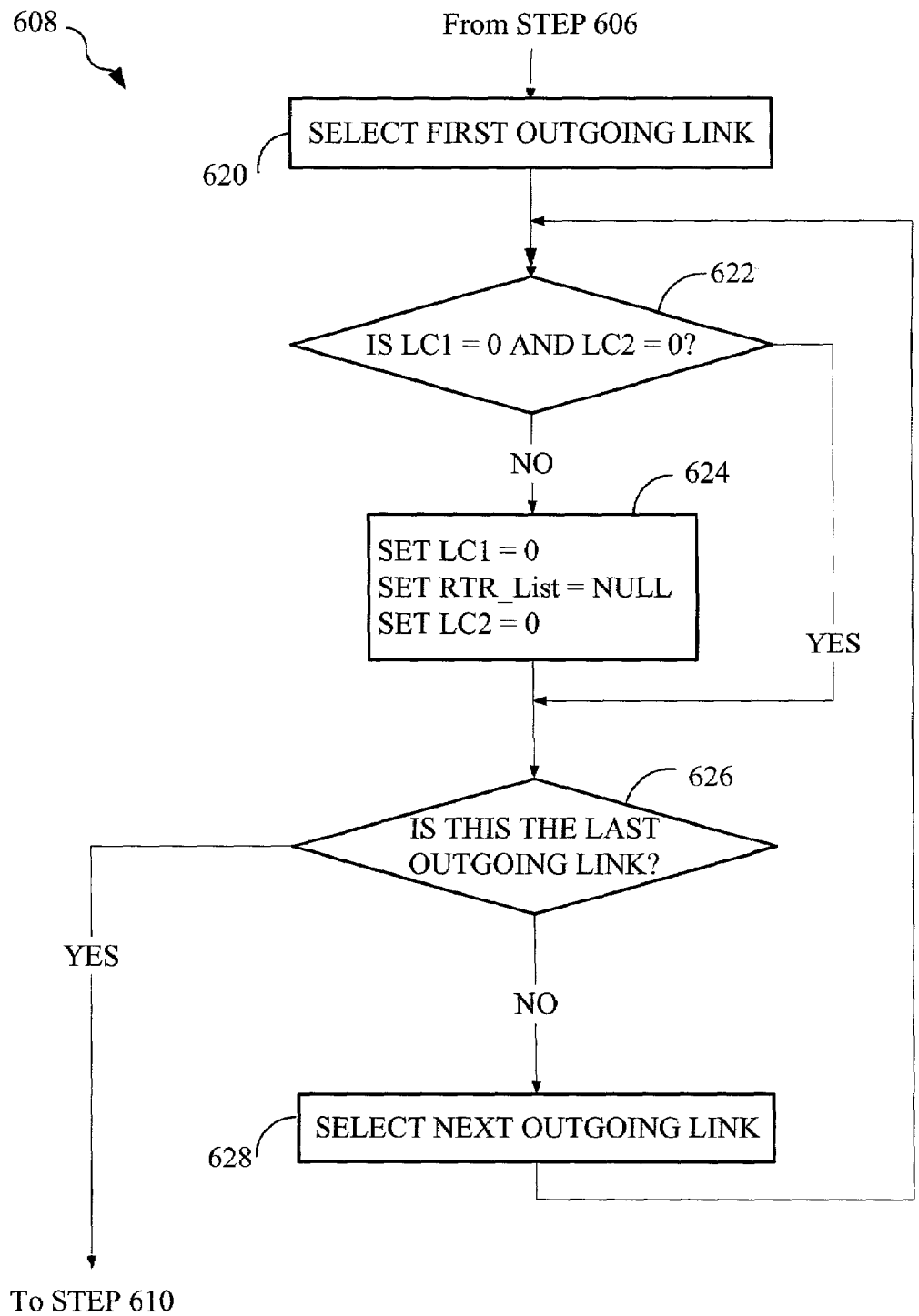
FIG. 9 is a flow chart illustrating the step 608 of resetting outgoing links of FIG. 8 in more detail.

In the step "Remove Conditional Links" 29 the conditional links of the first explicit route that were assigned in step 26 ("Transform Network") are removed as they are no longer needed. Step 29 will be described in detail later (FIGS. 8 and 9).

The step "Coalesce two Explicit Routes" 30 takes the two generated explicit routes and "coalesces" them. The process of explicit route coalescence is described in detail in the reference text book "Survivable Networks: Algorithms for Diverse Routing" by Dr. Ramesh Bhandari, Kluwer Academic Publishers, 1999. After coalescence performed by step 30, the two explicit routes from steps 24 and 28, again based on FIG. 1, will be AB-BE-EZ (shown as lines of long dashes, reference number 14) and AD-DC-CZ (shown as lines of short dashes, reference number 16).

The two explicit routes are finally returned as the result of the algorithm in step 32 "Return two Maximally Disjoint Paths". Using the example of FIG. 1, the method has found the two explicit routes AB-BE-EZ (14) and AD-DC-CZ (16), which are disjoint (do not share any links or nodes) and are the shortest disjoint pair possible. The coalesced explicit routes thus constitute two maximally disjoint paths.

Network Transformation

The description of step 26 ("Transform Network") of FIG. 2 will now be expanded with the aid of FIGS. 3 and 4. FIG. 3 is a more detailed flow chart of the step 26 "Transform Network", including step 100 ("Assign Previous Node"), step 102 ("Assign Current Node"), step 104 ("Assign Next Node"), step 106 ("Is Next Node Empty?"), step 108 ("Examine Outgoing Links"), step 110 ("Set Previous Node"); step 112 ("Set Current Node"), and step 114 ("Set Next Node").

As mentioned earlier, standard shortest path first algorithms use the concept of "link cost" to select the "shortest" path, where the link cost is an attribute of the network. Each link in the network has an associated link cost, which does not change during the path search. Furthermore, the link cost of a link is generally independent of link direction (link cost of link AB is the same as link cost of link BA in FIG. 1).

In the method of the invention, each link has three additional associated variables, a conditional link cost LC1, a conditional link cost LC2, and a router list RTR_List.

The conditional link costs LC1 and LC2, and the RTR_List are assigned and used during step 26 ("Transform Network"), based on the result of the path search of step 24.

The conditional link costs and RTR_List are assigned in step 108 ("Examine Outgoing Links", a step of the step 26, "Transform Network" of FIG. 2), and will be used in step 28 ("Get Second Explicit Route") of FIG. 2, as described below. To differentiate conditional link costs (LC1 and LC2) from the fixed "link cost" defined as an attribute of the network, the fixed link cost will be referred to as "original link cost".

The step 26 includes a loop (steps 106 to 114) in which all links of the first explicit route (see step 24, FIG. 1) are processed to determine the conditional link costs.

To initialize the loop, the first node of the first explicit route (in the example, the source node A of FIG. 1) is assigned to a variable "Previous_Node" (step 100), the second node of the first explicit route (node B in FIG. 1) is assigned to a variable "Current_Node" (step 102), and the third node (C) of the first explicit route is assigned to a variable "Next_Node" (step 104).

Before the loop is entered, a check is made to see if "Next_Node" is empty (step 106). This handles the case where the explicit route contains only two nodes, in which case "Next_Node" is empty, and step 26 is completed (exit step 106 at "YES", and continue to step 28). In most cases, there are at least three nodes in the explicit route, and step 106 is exited through the path marked "NO".

Step 108 ("Examine Outgoing Links") is further expanded in FIG. 4 as will be described below.

In step 110 ("Set Previous Node") the variable "Previous_Node" is set to the value of "Current_Node", in step 112 ("Set Current Node") the variable "Current_Node" is set to the value of "Next_Node", and in step 114 ("Set Next Node") the variable "Next_Node" is set to the value of the node after "Next_Node" in the explicit route. In effect, at the end of the first iteration of the loop (steps 106 to 114), the three variables "Previous_Node", "Current_Node" and "Next_Node" are set to reflect the second, third, and fourth nodes of the explicit route. After the second iteration they reflect the third, fourth, and fifth nodes, and so on.

When the end of the explicit route is reached, this will be evident in step 106, when the variable "Next_Node" is found to be "empty". This causes the loop to terminate through the YES exit of step 106, and go to step 28 (FIG. 2).

Step 108 ("Examine Outgoing Links") is expanded and described with the aid of FIG. 4. The purpose of step 108 is to evaluate all outgoing links from the "Current Node" and adjust their conditional link costs LC1 and LC2 and the RTR_List. Initially (before step 22), the conditional link costs LC2 of all links are set to zero, and the RTR_List is NULL.

Step 108 expands into the following steps:
"Select First Outgoing Link" 200;
"Is This a Link to Previous Node" 202;
"Set LC1=Original Link Cost" 204;
"Is This a Link to Next Node" 206;
"Set LC1=Original Link Cost+Large Cost" 208;
"Set LC1=Original Link Cost, Set RTR_List=Next Node, and Set LC2=Original Link Cost+Large Cost" 210;
"Is This the Last Outgoing Link?" 212; and
"Select Next Outgoing Link" 214.

These steps form a loop that examines all outgoing links from the current node. A first outgoing link is selected in step 200. Step 202 examines if the link is a link to the Previous Node (assigned in step 100 or step 110 of FIG. 3). If it is a link to the Previous Node (exit labeled "YES" from step 202), conditional link cost LC1 is set to the original link cost (step 204). If the link is not a link to the Previous Node (exit "NO" from step 202), a further examination is made in step 206 to determine if the link is a link to the Next Node (assigned in step 104 or step 114 of FIG. 3). If it is a link to the Next Node (exit labeled "YES" from step 206), conditional link cost LC1 is set to the original link cost plus a large cost (step 208), where the large cost is of the order of several times the sum of all original link costs in the network, e.g. as large as four times the sum of all original link costs in the network.

The value of the large cost is selected based on the following reason. As explained earlier, link cost is used to guide the path selection algorithm into finding the shortest path. A large link cost makes it less likely that a link is selected to become a link in the shortest path. After a large cost of the order of several times the sum of all original link costs in the network is added to the link cost of a link, it is guaranteed that this link will not be selected during a shortest path search unless there is no other link available.

If the link is not a link to the Next Node (exit "NO" from step 206), LC1 is set to the original link cost, RTR_List is set to the Next Node, and LC2 is set to the original link cost plus the large cost (step 210).

Step 212 ("Is This the Last Outgoing Link?") is used to determine if all links have been processed. If the result is "YES", step 108 of FIGS. 3 and 4 is complete, and the algorithm continues with step 110 as shown in FIG. 3. If there are more links to be processed (exit "NO" from step 212), the next outgoing link is selected in step 214, and the procedure 108 is repeated starting at step 202.

Second Explicit Route Computation

The description of step 28 of FIG. 2 will now be expanded with the aid of FIGS. 5, 6 and 7.

The computation of the second explicit route is a modified version of the SPF algorithm. It may be recalled that in SPF algorithm all nodes of the network are listed initially in a candidate list (of nodes). It may also be recalled that the purpose of the SPF algorithm is to find a shortest path from a source node to a destination node (for example, from node A to node Z in FIG. 1). A second list of nodes called the SPF list, is initially empty. At the start of the SPF algorithm, the source node is removed from the candidate list, becomes the "current node", and is placed in the SPF list. As the SPF algorithm progresses, links to adjacent nodes of the "current node" are evaluated, and adjacent nodes are placed in the SPF list, based on the accumulated cost to reach them from the source node. At the same time an "explicit route" (list of nodes on the shortest path from the source node) is maintained. When all links of the "current node" have been evaluated, the last node of the current "explicit path" becomes the "current node". The SPF algorithm terminates when the "explicit route" reaches the destination node.

For the SPF algorithm to work, it is not necessary to have all nodes of the network to be initially listed in the candidate list. The algorithm will also work if it starts at the source node and fills in the candidate list for all neighbors the source node is currently connecting to. The algorithm keeps on filling in the candidate list every time it reaches a new node.

The step 28 of FIG. 2 of the method of the first embodiment ("Get Second Explicit Route") follows the SPF algorithm, but is modified to make use of the conditional link costs LC1 and LC2, and the value of RTR_List (resulting from the step 26 "Transform Network" of FIG. 2) instead of the original link costs.

Step 28 expands into a number of steps shown in FIG. 5 (steps 300–318), two of which are further expanded into more detailed steps (FIG. 6 is an expansion of step 306, and FIG. 7 is an expansion of step 310).

Coming from step 26 (see FIG. 2), step 28, expanded in FIG. 5, starts with step 300 ("Set V=Source Node, Cost to Reach V=0") and step 302 ("Select First Outgoing Link, Set W=Neighbor of V"). This is followed by a loop which starts with a decision step 304 ("Were all Links Processed?") and ends with either the step 318 ("Select Next Outgoing Link, Set W=Neighbour of V") or the step 316("Select First Outgoing Link, Set W=Neighbour of V"). Within the body of the loop, a first sequence of steps (from exit "NO" of step 304) includes step 306 ("Determine Conditional Link Cost LC"), step 308 ("Explicit Route Cost=Cost to Reach V+LC"), and step 310 ("Compute Explicit Route"). A second sequence of steps starts from exit "YES" of step 304 and includes steps 312 ("Is Candidate List Empty?"), step 314 ("Select V=Lowest Cost Node from Candidate List"), step 315 ("Insert V into SPF List"), and step 316("Select First Outgoing Link, Set W=Neighbour of V"). Step 312 ("Is Candidate List Empty?") is a decision step. If the result is "YES", the loop is exited, and the algorithm goes to step 30 of FIG. 2. If the result is "NO", the loop continues with step 314.

Step 28 ("Get Second Explicit Route") uses two node variables V and W, where V identifies a node (the "current node"), and W identifies a node which can be reached from V through an outgoing link, that is a link from V to W. Associated with each node is a "cost to reach" value, which is computed during the process of step 28. The "cost to reach" of node V represents the accumulated (summed) cost of the links from the source node to the node V.

The links from the source node to the node V constitute the current "explicit route" to V. When step 28 finishes, V will be the destination node, and the "explicit route" to V will be the "Second Explicit Route", which is computed by step 28.

When step 28 starts, i.e. in step 300, V is assigned to the source node (e.g. A in the example of FIG. 1), and the cost to reach V is set to 0.

In step 302, the loop (steps 304 to 318) is initialized by setting the variable W to the neighbor node of V that is reached over the first outgoing link of V.

Step 304 is a decision step that determines whether all links from V have been processed. If the result is "NO", the flow of the algorithm is directed through steps 306, 308, and 310, to step 318 ("Select Next Outgoing Link, Set W=Neighbor of V"). In step 318, the next outgoing link of node V is selected, and the corresponding neighbor node of V is assigned to W. Processing then continues at the decision step 304.

In step 306 ("Determine Conditional Link Cost LC"), a conditional link cost LC is determined. Step 306 is 5 expanded in FIG. 6 and described in more detail below.

The cost to reach node W is computed in step 308 as the sum of the "cost to reach" node V plus the conditional link cost LC from step 306. It is assigned to the "Explicit Route Cost" (box 308).

In step 310 ("Compute Explicit Route"), a number of special cases are considered, and the "explicit route" from the source node to the current node V is computed or re-computed. This step is expanded in FIG. 7 and described in more detail below.

When the result of the decision step 304 ("Were all Links Processed?") is "YES", all outgoing links of the node V have been processed, that is all neighboring nodes of node V have a "cost to reach" assigned to them. Processing then continues with the decision step 312 ("Is Candidate List Empty?").

If the result of decision step 312 is "NO", the candidate list is scanned to find the node with the lowest "cost to reach" (step 314 "Select V=Lowest Cost Node from Candidate List") and assigned to the variable V. The selected node V is removed from the candidate list and inserted in the SPF list (step 315 "Insert V into SPF List"). In step 316 ("Select First Outgoing Link, Set W=Neighbour of V"), the loop (starting at step 304) is initialized again by setting the variable W to the neighbor node of V that is reached over the first outgoing link of V.

If the result of decision step 312 is "YES", there remain no more nodes in the candidate list, and step 28 is finished. The "Second Explicit Route", computed by step 28, is the last "explicit route" computed in step 310.

The reader's attention is now directed to the detailed description of step 306 ("Determine Conditional Link Cost LC"), which is expanded in FIG. 6.

Step 306 includes the decision steps 400 ("Is LC2=Zero?") and 402 ("Is Previous Node=RTR_List"), as well as the assignment steps 401 ("Set Previous Node=$2^{nd}$ Last hop of the explicit route"), 404 ("Set Link Cost LC=LC2") and 406 ("Set Link Cost LC=LC1"). The exit "NO" from step 400 leads through assignment step 401 to the further decision step 402, while exit "YES" from step 400 leads to the assignment step 406. Exit "NO" from decision step 402 leads to the assignment step 404, and exit "YES" from step 402 leads to the assignment step 406.

"Previous Node" is a temporary variable used only in step 306. It is set in step 401 to a value, which is found by scanning the current "explicit route" back to the second last node. "Previous Node" is then compared in decision step 402 with the link's current RTR_List (that had been set in step 210 of FIG. 4).

The result of step 306 is the assignment of either LC2 (step 406) or LC1 (step 404) to the conditional link cost LC, which is used by the subsequent step 308 (in FIG. 5). The values of LC1 and LC2, associated with each of the links in the network, were previously determined in step 26 ("Transform Network") of the method. The decision logic (steps 400 and 402 together) has the result that the conditional link cost LC is set to the value LC1 if either the value of LC2 is zero, or if the previous node in the "explicit route" is equal to the link's RTR_list. Otherwise, LC is set to LC2.

The reader's attention is now directed to the detailed description of step 310 ("Compute Explicit Route"), which is expanded in FIG. 7.

The expanded step 310 in FIG. 7 includes a number of decision steps (steps 500, 502, 504, 506, 508, 510, 512), three action steps (514, 518, 520), and a "no action" step (516). The decision steps 500 to 512 form a decision tree resulting in one of three actions 514, 518, 520, or no action 516.

Because of the complexity of the conditions upon which the decisions are based, some of the conditions are identified in FIG. 7 only as "Condition #i", "i" ranging from 1 to 5. Similarly, the actions are identified in FIG. 7 only as "Action #j", "j" ranging from 1 to 3.

The purpose of step 310 ("Compute Explicit Route") is to evaluate the currently processed node W (assigned in steps 302 and 318 of FIG. 5), which is one of the neighbors of the current node V.

At the start of step 310, the cost to reach node W has been determined as the "Explicit Route Cost" (step 308, FIG. 5).

The node W will be found either in the SPF list (decision step 500 "Is W in SPF list?" exit "YES"), in the Candidate list (tracing through decision step 500 exit "NO" leading to decision step 504 "Is W in Candidate List?" exit "YES"), or in neither list (tracing through decision step 500 exit "NO" and decision step 504 exit "NO").

If the node W is in the SPF list (decision step 500, exit "YES"), condition #1 is evaluated (decision step 502). If the result of condition #1 is "NO", step 514 (action #1) is executed. If the result of condition #1 is "YES", then the series of conditions #2 to #4 (decision steps 506, 510, 512) is evaluated. If the result of all these conditions is "YES", action #1 (step 514) is also executed; however if the result of any of the conditions #2, #3, or #4 is "NO", then no action is taken (pro-forma step 516 "No Action").

If the node W is in the Candidate list (exit "YES" from decision step 504), then a further condition is tested (condition #5 in decision step 508). If the result of step 508 is "YES", action #2 is executed (step 518, "Action #2"), otherwise no action is taken (pro-forma step 516 "No Action").

If the result of the decision step 504 ("Is W in Candidate list?") is "NO", then action #3 is taken (step 520, "Action #3").

After any of the actions #1, #2, #3 or no action 516, step 310 is completed, and processing continues with step 318 (FIG. 5).

Having described the logical flow of the steps, which make up the step 310, we will now describe in detail the conditions and actions of these steps.

The conditions generally constitute tests, involving the node W and its neighbours, namely:

Condition #1: Is the explicit route cost (computed in step 308) greater than the previously recorded cost to reach W?

Condition #2: Is node W not equal to the destination node?

Condition #3: Are all nodes that are neighbors of node W not equal to the destination node?

Condition #4: Do any of the nodes that are neighbors of node W have a link that has RTR_List equal to W?

Condition #5: Is the explicit route cost (computed in step 308) less than the previously recorded cost to reach W?

Action #1: Re-calculate the "explicit route" using the "explicit route" associated with node V; remove node W from the SPF list and put it back in the Candidate list.

Action #2: Re-calculate the "explicit route" using the "explicit route" associated with node V; record the "cost to reach" W as the value of the "explicit route cost" computed in step 308.

Action #3: Calculate the "explicit route" using the "explicit route" associated with node V; insert node W into the Candidate list.

Remove Conditional Links

The description of step 29 of FIG. 2 will now be expanded with the aid of FIGS. 8 and 9.

Step 29, expanded in FIG. 8, is similar to step 26, which was expanded in FIG. 3. The purpose of step 29 ("Remove Conditional Links") is to reset the values that were set in step 26 ("Transform Network"). To recall, step 26 (FIG. 3) includes a loop to visit nodes of the first explicit route. The operative step in step 26, which sets the values LC1, LC2 and RTR_List, is step 108 "Examine Outgoing Links".

Step 29 includes the same loop structure as step 26. The steps 600, 602, 604, 606, 610, 612, and 614, in FIG. 8 are equivalent to the corresponding steps 100, 102, 104, 106, 110, 112 and 114 in FIG. 3. The operative step in step 29, which resets the values LC1, LC2 and RTR_List, is step 608 "Reset Outgoing Links".

Step 608 ("Reset Outgoing Links") is further expanded and described with the aid of FIG. 9. The purpose of step 608 is to consider all outgoing links from the "Current Node" and reset their conditional link costs LC1 and LC2 and the RTR_List. This will restore these values to the same condition they had before step 26 ("Transform Network"), that is the conditional link costs LC1 and LC2 of all links are set to zero, and their RTR_List is set to NULL.

Step 608 expands into the following steps:
"Select First Outgoing Link" 620;
"Is LC1=0 and LC2=0?" 622;
"Set LC1=0, Set RTR_List=0, Set LC2=0" 624;
"Is This the Last Outgoing Link?" 626; and
"Select Next Outgoing Link" 628.

These steps form a loop that processes all outgoing links from the current node.

A first outgoing link is selected in step 620. The decision step 622 examines if the conditional link costs LC1 and LC2 of this link are zero. If either LC1 or LC2 are not zero (exit "NO" from step 622), then step 624 follows, in which the conditional link cost LC1 and LC2 are set to zero and the RTR_List is set to NULL. If both LC1 and LC2 are zero (exit "YES" from step 622), the step 624 is bypassed.

Step 626 ("Is This the Last Outgoing Link?") is used to determine if all links have been processed. If the result is "YES", step 608 of FIGS. 8 and 9 is complete, and the procedure continues with step 610 as shown in FIG. 8. If there are more links to be processed (exit "NO" from step 626), the next outgoing link is selected in step 628, and the loop of the procedure 608 is repeated starting at step 622.

Thus, an efficient method is provided for determining two maximally disjoint shortest paths in a network. Using the method illustrated in FIG. 2 and further detailed in FIGS. 3–9, two maximally disjoint shortest paths can be found from a source node to a destination node. For example, in the network illustrated in FIG. 1, the two maximally disjoint paths from source "A" to destination "Z" computed by the method are AB-BE-EZ (shown by lines of long dashes and designated by reference numeral 14) and AD-DC-CZ (shown by lines of short dashes and designated by reference numeral 16).

The method of the first embodiment described above is efficient because the network transformation of the method does not require the splitting of nodes, but rather relies on identifying conditional links, while the determination of the second explicit route is based on a SPF algorithm modified in a simple manner to take into account the conditional links.

Extension to Greater than Two Paths

Figure 10:
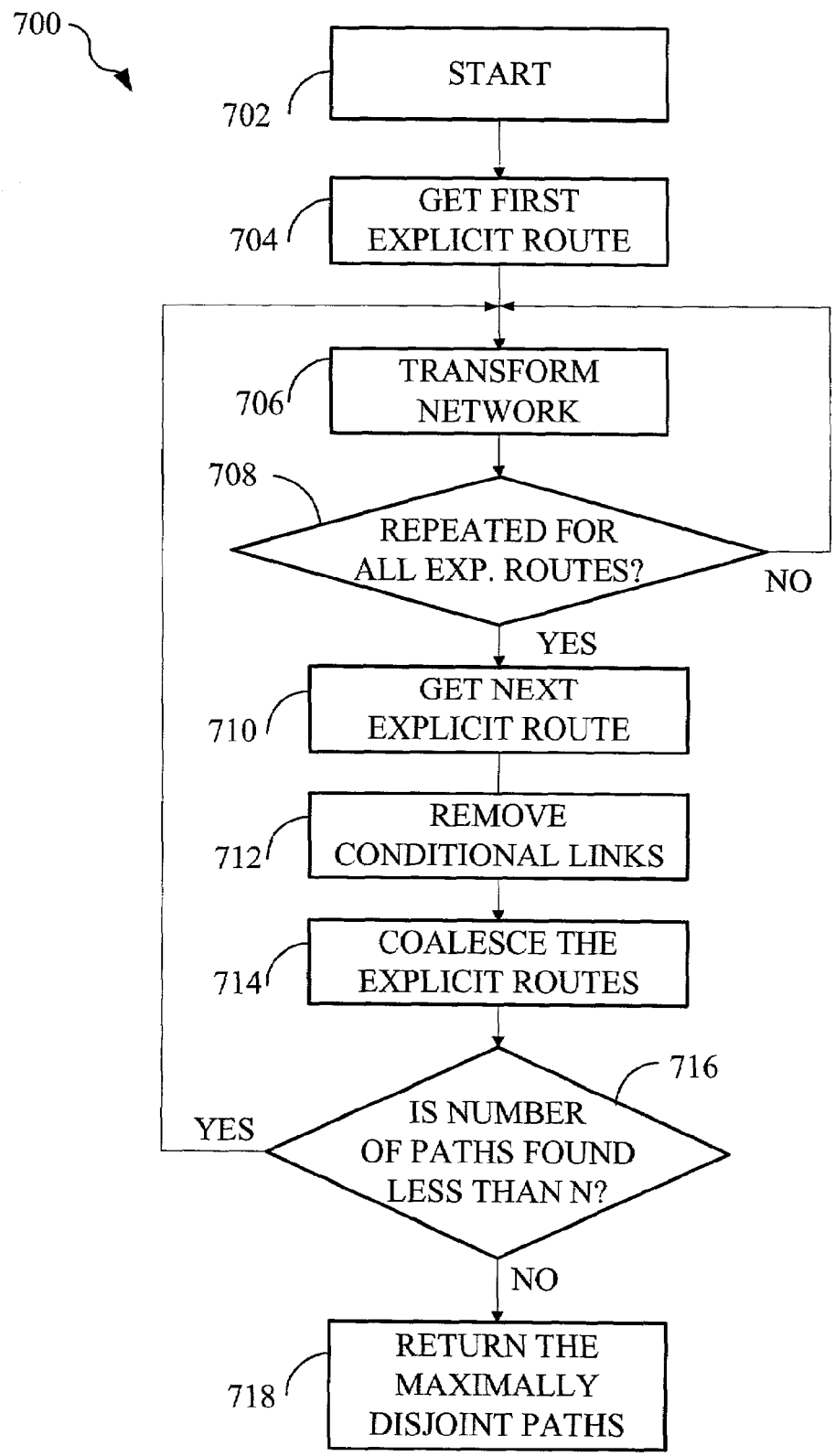
FIG. 10 is a flow chart illustrating a method for selecting N maximally disjoint shortest paths according to a second embodiment of the invention.

A method for selecting N maximally disjoint shortest paths in a network according to the second embodiment of the invention is illustrated by flow chart 700 shown in FIG. 10. It is assumed that N is equal or greater than 2.

The flow chart 700 includes nine steps, beginning at step 702 ("Start"), continuing through step 704 ("Get First Explicit Route"), step 706 ("Transform Network"), decision step 708 ("Repeated for All Explicit Routes?"), step 710 ("Get Next Explicit Route"), step 712 ("Remove Conditional Links"), step 714 ("Coalesce the Explicit Routes"), a decision step 716 ("Is the number of paths found less than N?"), and step 718 ("Return The Maximally Disjoint Paths"). The exit labeled "NO" of the decision step 708 leads back to step 706, forming a loop as long as the condition of 708 is not satisfied. The exit labeled "YES" of decision step 708 permits the method to continue with step 710. The exit labeled "YES" of the decision step 716 leads back to step 706, in effect forming a loop as long as the condition of 716 is satisfied. The exit labeled "NO" of step 716 leads to step 718, which terminates the method.

The method of the second embodiment is presented in its entirety, but reference is made to equivalent and similar steps of the method of the first embodiment in order to simplify the description.

At the Start 702, the network topology, including link costs and the identities of the source and destination nodes, are known. This step is equivalent to step 22 of FIG. 2.

The step "Get First Explicit Route" 704 uses a shortest path first (SPF) algorithm of the known art, for example a Dijkstra SPF algorithm, to find a first shortest route. This step is equivalent to step 24 of FIG. 2.

In the step "Transform Network" 706 a transformation of the network will be generated, taking into account one of the explicit routes found so far. This step is similar to, but not exactly the same as, step 26 of FIG. 2. Step 706 is described in detail with the help of FIGS. 11, 12, and 13.

Figure 11:
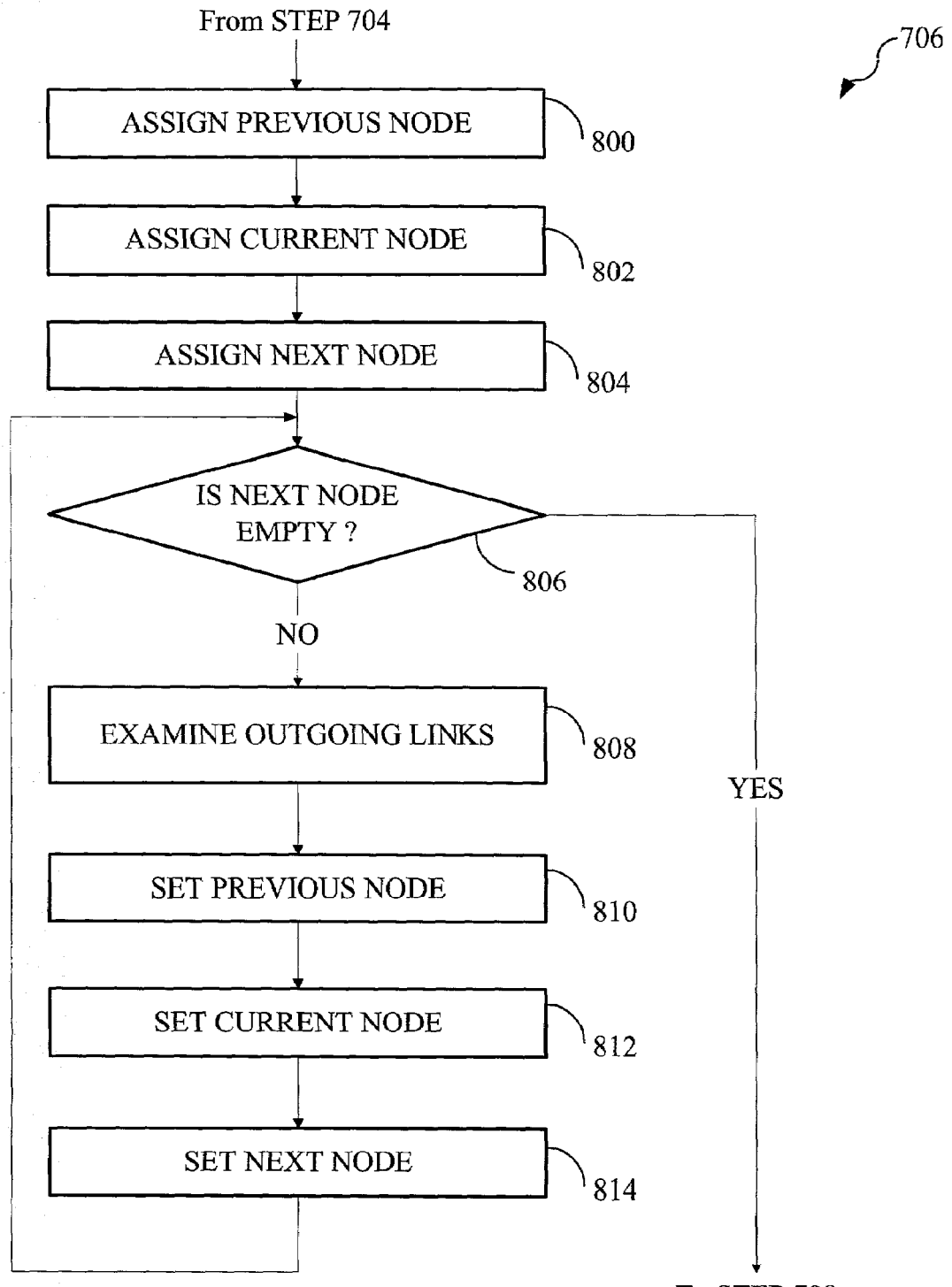
FIG. 11 is a flow chart illustrating the step 706 of network transformation of FIG. 10 in more detail.

The step 706 ("Transform Network") is expanded in FIG. 11. The step 706 has the same loop structure as step 26 in FIG. 3. The steps 800, 802, 804, 806, 810, 812, and 814 in FIG. 11 are equivalent to the corresponding steps 100, 102, 104, 106, 110, 112, and 114 in FIG. 3. The operative step in step 706, which examines the outgoing links and sets the values LC1, LC2 and RTR_List, is step 808 "Examine Outgoing Links". The step 808 in FIG. 11 is similar to, but not the same as, the corresponding step 108 in FIG. 3. Step 808 is described in detail with the help of FIGS. 12 and 13.

Figure 12:
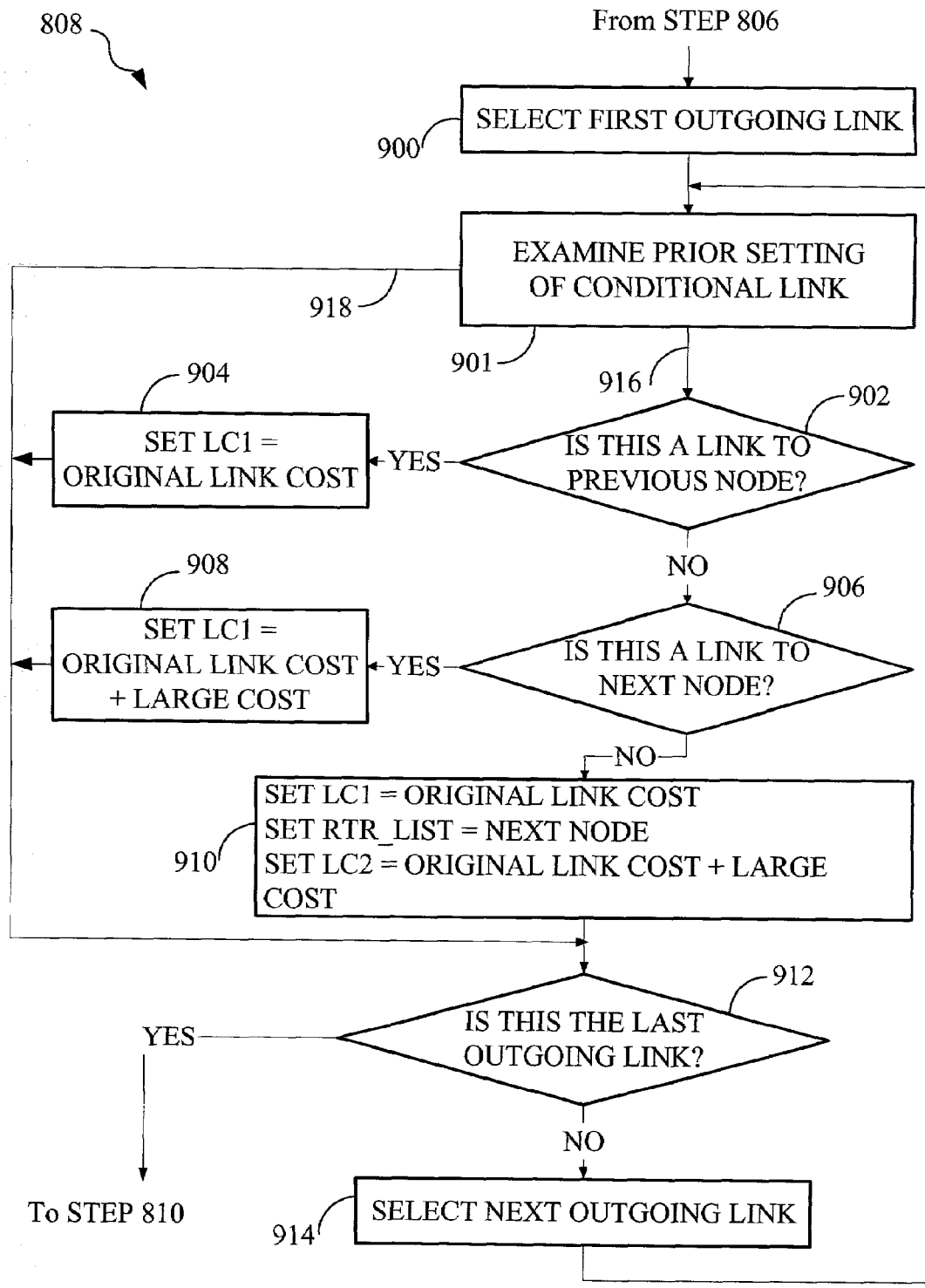
FIG. 12 is a flow chart illustrating the step 808 of examining outgoing links and assigning conditional link costs of FIG. 11 in more detail.

The step 808 ("Examine Outgoing Links") is expanded in FIG. 12. The step 808 is similar to the step 108, shown in detail in FIG. 4. Steps 900, 902, 904, 906, 908, 910, 912, and 914 in FIG. 12 are equivalent to the corresponding steps 200, 202, 204, 206, 208, 210, 212, and 214 in FIG. 4. The step 808, however, includes an additional step 901 ("Examine Prior Setting of Conditional Link").

The step 901 is performed before the step 902. The step 901 has one entry point, and can be reached from step 900 ("Select First Outgoing Link"), as well as from step 914 ("Select Next Outgoing Link"). The step 901 has two exits links labeled 916 and 918. The exit link 916 of step 901 leads to the step 902. The exit link 918 of step 901 leads to the step 912.

The purpose of the step 901 (which was not needed in the first embodiment) is to examine the parameters LC1 and LC2, which may already have been set during the computation of a previous network transformation (please, recall from FIG. 10, which shows that step 706 "Transform Network" may be entered a number of times).

Figure 13:
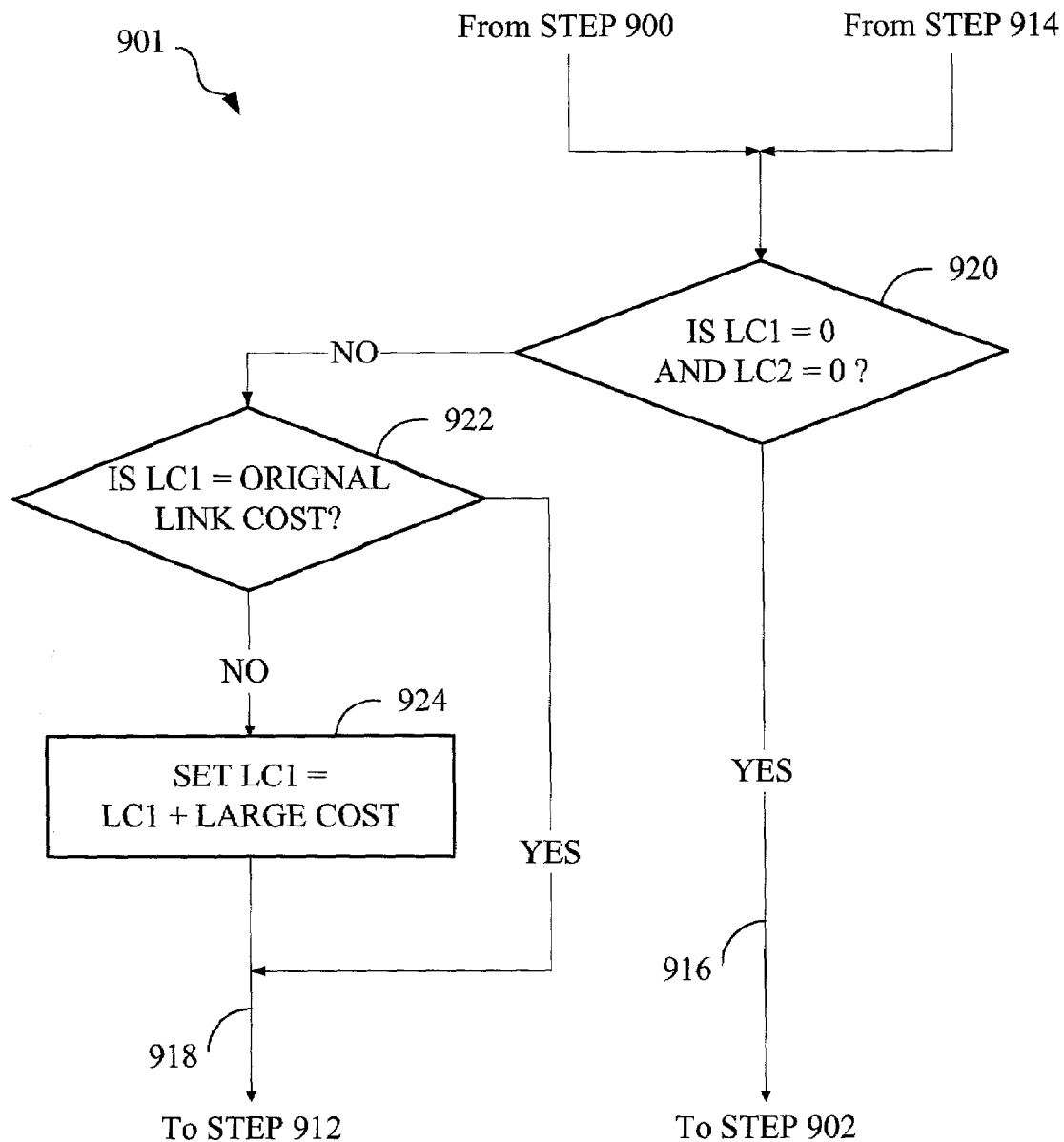
FIG. 13 is a flow chart illustrating the step 901 of examining prior settings of a conditional link of FIG. 12 in more detail.

The step 901 is expanded and described in detail in FIG. 13. The step 901 includes three steps, a decision step 920 ("Is LC1=0 and LC2=0?"), a decision step 922 ("Is LC1=Original Link Cost"), and a step 924 ("Set LC1=LC1+ Large Cost").

The decision step 920 ("Is LC1=0 and LC2=0?") is reached from step 900 and from step 914 (FIG. 12). The exit labeled "YES" from step 920 leads via link 916 to step 902 (FIG. 12). The exit "NO" from step 920 leads to the decision step 922 ("Is LC1=Original Link Cost"). The exit of step 922 labeled "YES" leads via link 918 to step 912 (FIG. 12).

The exit of step 922 labeled "NO" leads to the step 924 ("Set LC1=LC1+Large Cost"). The exit of step 924 leads via the link 918 to step 912 (FIG. 12).

In step 920 ("Is LC1=0 and LC2=0?") a determination is made whether both LC1 and LC2 of the link being examined are zero. If this is true (exit labeled "YES"), this indicates that the link has not been set as a conditional link during a prior iteration of the network transformation step. Consequently, the procedure continues with step 902.

If the determination of step 920 results in a decision of "NO", this indicates that the link may have a prior setting as a conditional link, and step 922 is entered.

In step 922 ("Is LC1=Original Link Cost"), a comparison of the value of the LC1 parameter with the original link cost of the link is made. If the two values are equal (exit labeled "YES"), the algorithm continues with step 912 (FIG. 12). If the two values are not equal (exit labeled "NO"), the procedure continues with step 924.

In the step 924, the conditional link cost LC1, whatever its current value, is incremented by the value of a large cost, where the large cost is of the order of several times the sum of all original link costs in the network, e.g. as large as four times the sum of all original link costs in the network (for the rationale, please see the description of step 108 in the first embodiment). After step 924, the procedure continues with step 912 (FIG. 12).

The step "Get Next Explicit Route" 710 in FIG. 10 uses a modified SPF algorithm to generate the next explicit route. This step is equivalent to step 28 of FIG. 2 and expanded in detail in FIGS. 5, 6, and 7, described earlier.

The step "Coalesce the Explicit Routes" 714 takes all explicit routes found so far and "coalesces" them. This step is similar to step 610 of FIG. 2, but not exactly the same. The process of explicit route coalescence for more than two routes is described in detail in the reference text book "Survivable Networks: Algorithms for Diverse Routing" by Dr. Ramesh Bhandari, Kluwer Academic Publishers, 1999.

The decision step 716 ("Is the number of paths found less than N?") checks the loop condition, causing steps 706, 708, 710, 712, and 714 to be repeated until "N" paths have been found.

The "N" explicit routes found are finally returned as the "N" maximally disjoint paths in step 718 "Return the Maximally Disjoint Paths".

Thus, the method of the second embodiment of the invention provides an efficient way for determining "N" maximally disjoint paths in a network, where "N" equals two or more.

The method of the second embodiment is efficient, especially in the case where "N" is greater than two, because the network transformation of the method does not require the splitting of nodes, but rather relies on identifying conditional links, while the determination of the additional explicit routes is based on the SPF algorithm modified in a simple manner to take into account the conditional links.

Although specific embodiments of the invention have been described in detail, it will be apparent to one skilled in the art that variations and modifications to the embodiments may be made within the scope of the following claims.

What is claimed is:

1. A method for selecting two maximally disjoint shortest paths between a source node and destination node in a network, comprising the steps of:
   determining a first explicit route between the source and destination nodes by using an original link cost for each link in the network;
   transforming the network by introducing conditional link costs;
   wherein the step of introducing conditional link costs comprises the step of adding additional parameters to links in the network and determining the conditional link costs depending on the position of each link relative to the first explicit route.
   determining a second explicit route between the source and destination nodes in the transformed network taking into account the conditional link costs; and
   determining the two maximally disjoint shortest paths between the source and destination nodes by coalescing the first and second explicit routes.

2. A method as described in claim 1, wherein the step of adding the additional parameters comprises adding a first conditional link cost (LC1), a second conditional link cost (LC2), and a router list parameter.

3. A method as described in claim 2, wherein the step of adding the first conditional link cost comprises adding the first conditional link cost, which is equal to one of the following:
   original link cost;
   original link cost plus a large cost, the large cost being of the order of several times the sum of the original link costs of all links in the network; and
   zero.

4. A method as described in claim 2, wherein the step of adding the second conditional link cost comprises adding the second conditional link cost, which is equal to one of the following:
   original link cost plus a large cost, the large cost being of the order of several times the sum of the original link costs of all links in the network; and
   zero.

5. A method as described in claim 3, wherein the step of determining the conditional link costs depending on the position of each link relative to the first explicit route, comprises the step of assigning LC1 equal to one of the following:
   the original link cost plus the large cost, if the link is a link belonging to the first explicit route; and
   the original link cost otherwise.

6. A method as described in claim 5, wherein the step of determining the conditional link costs depending on the position of each link relative to the first explicit route, comprises the step of assigning LC1 equal to the original link cost plus the large cost, if the link is a link belonging to the first explicit route and not the first link of the first explicit route.

7. A method as described in claim 4, wherein the step of determining the conditional link costs, depending on the position of each link relative to the first explicit route, comprises the step of assigning LC2 equal to:
   the original link cost plus the large cost, if the link does not belong to the first explicit route, but originates from a node on the first explicit route except the source and destination nodes; and
   zero otherwise.

8. A method as described in claim 2, wherein the step of adding the router list parameter comprises adding the router list parameter to a link, which originates from a node on the first explicit route and terminates on a node that is not the next node on the first explicit route, the router list parameter indicating the next node on the first explicit route.

9. A method as described in claim 1, wherein the step of determining the second explicit route between the source and destination nodes in the transformed network comprises the step of determining a path from the source node to the destination node by using a conditional link cost LC, which is set equal to one of following:
LC1;
LC2; and
the original link cost.

10. A method as described in claim 9, wherein the step of determining the path from the source node to the destination node by using the conditional link cost comprises setting LC equal to one of the following:
LC is equal to the original link cost if both LC1 and LC2 equal to zero;
LC=LC2 if LC2 is not zero, and if the router list parameter of the link is not indicating the previous node of the second explicit route; and
LC=LC1 otherwise.

11. A method for selecting "N" maximally disjoint shortest paths between a source node and destination node in a network, "N" being equal or greater than two, the method comprising the steps of:
(a) determining a first explicit route between the source and destination nodes by using an original link cost for each link in the network;
(b) for each explicit route found so far, transforming the network by introducing conditional link costs; wherein the step of introducing conditional link costs comprises the step of adding additional parameters to links in the network and determining the conditional link costs depending on the position of each link relative to the each explicit route found so far;
(c) determining the next explicit route between the source and destination nodes in the transformed network taking into account the conditional link costs;
(d) removing conditional link costs;
(e) determining maximally disjoint shortest paths represented by the explicit routes found so far between the source and destination nodes by coalescing the explicit routes found so far; and
(f) repeating the steps (b) to (e) "i" number of times, wherein "i"=N−1.

12. A method as described in claim 11, wherein the step of adding the additional parameters comprises adding a first conditional link cost (LC1), a second conditional link cost (LC2), and a router list parameter.

13. A method as described in claim 12, wherein the step of adding the first conditional link cost comprises adding the first conditional link cost, which is equal to one of the following:
the original link cost;
the link cost assigned so far;
original link cost plus a large cost, the large cost being of the order of several times the sum of the original link costs of all links in the network;
the link cost assigned so far plus the large cost; and
zero.

14. A method as described in claim 12, wherein the step of adding the second conditional link cost comprises adding the second conditional link cost, which is equal to one of the following:
original link cost plus a large cost, the large cost being of the order of several times the sum of the original link costs of all links in the network;
the link cost assigned so far plus the large cost; and
zero.

15. A method as described in claim 13, wherein the step of determining the conditional link costs depending on the position of each link relative to each of the explicit routes found so far comprises the step of assigning LC1 equal to one of the following, the step being performed for each of the explicit routes found so far:
the original link cost plus the large cost, if the link is a link belonging to the explicit route and LC1=0 before the step of assigning LC1 is performed;
the link cost assigned so far plus the large cost, if the link is a link belonging to the explicit route and LC1 is not zero before the step of assigning LC1 is performed; and
the original link cost otherwise.

16. A method as described in claim 15, wherein the step of assigning LC1 comprises the step of assigning LC1 equal to the original link cost plus the large cost, if the link is a link belonging to the explicit route and not the first link of the explicit route.

17. A method as described in claim 14, wherein the step of determining the conditional link costs depending on the position of each link relative to the explicit routes found so far comprises the step of assigning LC2 equal to one of the following, the step being performed for each of the explicit routes found so far:
the original link cost plus the large cost, if the link does not belong to the explicit route, but originates from a node on the explicit route except the source and destination nodes and LC2=0 before performing the step of assigning LC2;
the link cost assigned so far plus the large cost, if the link does not belong to the explicit route, but originates from a node on the explicit route except the source and destination nodes and LC2 is not zero before performing the step of assigning LC2; and
zero otherwise.

18. A method as described in claim 12, wherein the step of adding the router list parameter comprises adding the router list parameter to a link, which originates from a node on the explicit route and terminates on a node that is not the next node on the explicit route, the router list parameter indicating the next node on the explicit route, the step being performed for each of the explicit routes found so far.

19. A method as described in claim 12, wherein the step of determining the next explicit route between the source and destination nodes in the transformed network comprises the step of determining a path from the source node to the destination node by using a conditional link cost LC, which is set equal to one of following:
LC1;
LC2; and
the original link cost.

20. A method as described in claim 19, wherein the step of determining the path from the source node to the destination node comprises setting the conditional link cost equal to one of the following:
LC is equal to the original link cost if both LC1 and LC2 equal to zero;
LC=LC2 if LC2 is not zero, and if the router list parameter of the link is not indicating the previous node of the second explicit route;
LC=LC1 otherwise.

21. A communications network having a plurality of nodes connected with links, the network comprising means for selecting two maximally disjoint shortest paths between source and destination nodes in the network, the means being capable of performing the steps of the method described in claim 1.

22. A communications networks having a plurality of nodes connected with links, the network comprising means for selecting "N" maximally disjoint shortest paths between source and destination nodes in the network, the means being capable of performing the steps of the method described in claim 11.

23. An apparatus for selecting two maximally disjoint shortest paths between source and destination nodes in the network, the apparatus comprising a path computation processor capable of performing the steps of the method described in claim 1.

24. An apparatus for selecting "N" maximally disjoint shortest paths between source and destination nodes in the network, the apparatus comprising a path computation processor capable of performing the steps of the method described in claim 11.

* * * * *

UNITED STATES PATENT AND TRADEMARK OFFICE
CERTIFICATE OF CORRECTION

PATENT NO. : 7,046,634 B2  Page 1 of 1
APPLICATION NO. : 10/121654
DATED : May 16, 2006
INVENTOR(S) : V. C. C. Wong et al.

It is certified that error appears in the above-identified patent and that said Letters Patent is hereby corrected as shown below:

Column 16, line 7, "route." is corrected to read as --route;--.

Column 19, line 1, "networks" is corrected to read as --network--.

Signed and Sealed this

Nineteenth Day of August, 2008

JON W. DUDAS
*Director of the United States Patent and Trademark Office*